United States Patent [19]

Caldwell

[11] 4,343,824
[45] Aug. 10, 1982

[54] METHOD FOR CARBONATING LIQUIDS IN SITU

[76] Inventor: Michael C. Caldwell, 352 N. Caswell Rd., Charlotte, N.C. 28204

[21] Appl. No.: 186,639

[22] Filed: Sep. 12, 1980

Related U.S. Application Data

[62] Division of Ser. No. 7,438, Jan. 29, 1979, Pat. No. 4,222,972.

[51] Int. Cl.³ .............................................. A23L 2/40
[52] U.S. Cl. ..................................... 426/477; 99/275; 261/DIG. 7
[58] Field of Search ............... 261/65, 121 R, DIG. 7; 99/275; 426/474, 477

[56] References Cited

U.S. PATENT DOCUMENTS

| | | | |
|---|---|---|---|
| 935,698 | 10/1909 | Silberschmidt | 261/DIG. 7 |
| 1,907,301 | 5/1933 | Martin | 426/477 X |
| 1,912,439 | 6/1933 | Feller | 426/477 |
| 2,220,146 | 11/1940 | Curry | 426/477 |
| 2,732,117 | 1/1956 | Hillis | 261/DIG. 7 |
| 3,233,779 | 2/1966 | Cornelius | 426/477 X |
| 3,960,164 | 6/1976 | Kelley | 261/DIG. 7 |
| 4,093,681 | 6/1978 | Castillo et al. | 426/477 X |

*Primary Examiner*—Richard L. Chiesa
*Attorney, Agent, or Firm*—Clifton T. Hunt

[57] ABSTRACT

This invention provides a novel method and means for carbonating liquids in the container from which the liquids are served to the consumer with a minimum of carbonating gas and for maintaining and enhancing carbonation of the remaining liquid without expensive regulatory apparatus after withdrawal of a portion of the carbonated liquid. Inherent in the means and method to induce and regulate carbonation, the invention provides both means and method for regulating or substantially limiting the maximum volume of liquid introduced into the carbonation chamber as well as a means and method to purge air from the carbonation chamber. According to the invention, a fixed volume vessel and a dynamic capacity carbonating chamber, a pump and relief valves enable consistent carbonation and regulation of the carbonating pressure prior to and following dispensing of carbonated liquids while utilizing a finite, minimum quantity of carbonating gas. The dynamic capacity carbonating chamber is defined within a fixed volume vessel by a resilient, flexible relatively non-permeable air bag separating a liquid $CO_2$ gas phase from pressurized air. A manually operated pump and preset relief valves enable the maintenance of predetermined fixed pressures within the air chamber and carbonating chamber of the vessel without introducing atmospheric air into the carbonating chamber.

2 Claims, 4 Drawing Figures

METHOD FOR CARBONATING LIQUIDS IN SITU

CROSS-REFERENCE TO RELATED APPLICATION

This application is a division of my prior application Ser. No. 7,438, filed Jan. 29, 1979 for METHOD AND MEANS FOR CARBONATING LIQUIDS IN SITU, now U.S. Pat. No. 4,222,972.

BACKGROUND OF THE INVENTION

There are two basic types of carbonation, natural and artificial. One pertinent means of natural carbonation depends upon the action of fermenting yeasts upon residual sugar in solution. Yeast, in the presence of sugar, produces alcohol and carbon dioxide as end products of the fermentation process. In order to obtain natural yeast action carbonation, an appropriate amount of fermentable sugar is placed within the fixed volume of a container along with the yeast-beverage solution. After secure capping, the pressure increases in direct proportion to the rate of fermentation which is further dependent upon factors such as the amount of available fermentable sugar, relative proportion of yeast to sugar, temperature, and time.

Natural carbonation has the advantage of being done in situ or in the same container from which the contents are served to the consumer and has the advantage of eliminating the transfer of carbonated liquid and the consequent loss of carbonation during transfer. But the natural carbonation process described inherently has variances in carbonation level because of the several variables noted above. Another disadvantage is the length of time it takes for natural carbonation. As much as two weeks must be allowed for the beverage to adequately carbonate and settle yeast sediment. Additionally, the said natural carbonation process invariably includes air in the headspace and corresponding detrimental effects of oxygen, flavor loss and improper carbonation pressure; and any coincidental production of alcohol may be undesirable in soft drink formulations. Beverages such as soda water, club soda, quinine water, and carbonated mineral waters cannot be made by natural carbonation because there is no sugar in their recipes.

Artificial carbonation is achieved by introducing carbon dioxide gas into liquid within a fixed volume container under pressure. The gas diffuses rapidly into the liquid under adequate pressure and cool temperatures. But the withdrawal of carbonated liquid from a fixed volume container decreases the carbon dioxide pressure within the carbonated liquid remaining in the container in proportion to the volume of liquid withdrawn.

Some prior art devices compensate for the loss of carbon dioxide pressure when carbonated liquid is withdrawn from the container by introducing additional carbon dioxide under pressure into the fixed volume container in direct proportion to the loss of carbon dioxide pressure occasioned by the withdrawal of carbonated liquid from the container. Other prior art devices attempt restoration of carbon dioxide without regulation.

Some prior art carbonating devices include a diaphragm or air bag in their structure but to applicant's knowledge no prior art device uses a diaphragm or air bag as a principle in carbonation, or in combination with an air pump and relief valves to induce or to maintain a uniform pressure after carbonated liquid is withdrawn. The following disclosures show the state of the art known to applicant regarding the use of diaphragms or air bags in carbonation devices: U.S. Pat. No. 978,103, issued Dec. 6, 1910 to Charles L. Bastion, U.S. Pat. No. 935,698 issued Oct. 5, 1909 to Lewis Silberschmidt, British Pat. No. 11,914 of 1912 to Koenig and Stahl, Swedish Pat. No. 27,648 issued Aug. 24, 1907 to O. E. Ohlsson, and Danish Pat. No. 52,417 issued Dec. 7, 1936 to Hans Andvig and Johannes Freng.

SUMMARY OF THE INVENTION

According to the present invention, a carbonating apparatus providing maximum carbonation with a minimum of carbon dioxide gas is particularly suited for home use. The apparatus includes means for providing uniform predetermined pressure on the liquid during carbonation after equilibrium has been established and after withdrawal of a portion of the carbonated liquid.

The carbonator of the present invention includes a fixed volume container having rigid walls and containing a flexible, impervious, variable volume air bag. The space between the air bag and the inner wall of the vessel defines a carbonating chamber to contain liquid for carbonation. The container also includes a closure body which serves as a control block and houses a pump by which the air bag is filled with atmospheric air. The control block also houses a fixed supply of carbon dioxide gas and means for introducing the gas into the carbonating chamber exteriorly of the air bag. The control block also includes a tap for withdrawing liquid from the carbonating chamber.

Means are provided for readily removing the control block for cleaning and to gain access to the air bag and other operative parts within the vessel for maintenance. Liquid to be carbonated may be introduced into the carbonating chamber while the control block is removed, but for hygenic and regulatory control it is preferred to add liquid to the carbonating chamber by utilizing the carbonating apparatus, specifically the controlled release of air from the expanded air bag to induce siphoning of liquid from a source outside the fully assembled carbonating container into the carbonating chamber. Similarly, a cleaning agent such as sodium metabisulfate may be drawn into the carbonating chamber prior to use to rinse the chamber and passageways without removing the control block.

It is an object of this invention to provide a carbonator including a carbonating chamber into which liquid to be carbonated may be introduced; means for introducing a fixed quantity of carbon dioxide gas into the carbonating chamber; means to vent excessive carbon dioxide; means for introducing and regulating the volume of liquid to be carbonated; and means to purge air from the carbonation chamber.

In the illustrated embodiment, a sealed air bag within the carbonating chamber communicates with means to introduce atmospheric air to the bag and with means to vent air from the bag to the atmosphere above a predetermined pressure. The air bag may be expanded by pumping atmospheric air into it to expand the volume of space occupied by the bag within the container and thereby apply pressure to the contents of the carbonating chamber. The air bag is expandable to occupy the space left within the vessel when some of the liquid is withdrawn through a tap communicating with the carbonating chamber. An air relief valve vents air from the bag to the atmosphere in excess of a predetermined pressure.

It is another object of this invention to provide a novel method for carbonating a liquid within a household for home use, which method comprises the steps of providing a fixed volume container, providing a variable volume air bag within the container and a carbonating chamber within the container and exteriorly of the air bag, introducing liquid into the carbonating chamber, introducing carbon dioxide gas into the liquid, introducing atmospheric air under pressure into the air bag to expand the bag within the container and apply pressure on the liquid to facilitate carbonation, withdrawing a portion of the carbonated liquid, and introducing an additional volume of air into the bag to expand the bag and compensate for the volume of liquid removed from the carbonating chamber, thereby restoring the desired carbonating pressure to the liquid. Adjustable relief valves are provided in communcation with the carbonating chamber and in communication with the interior of the bag and are pre-set at desired pressure levels to draw off excess carbon dioxide and excess air, respectively.

The container is preferably of a size to hold one to two gallons of liquid and to conveniently fit within a household refrigerator, although the container may be of any desired size and may be used commercially.

DETAILED DESCRIPTION OF THE INVENTION

Figure 1:
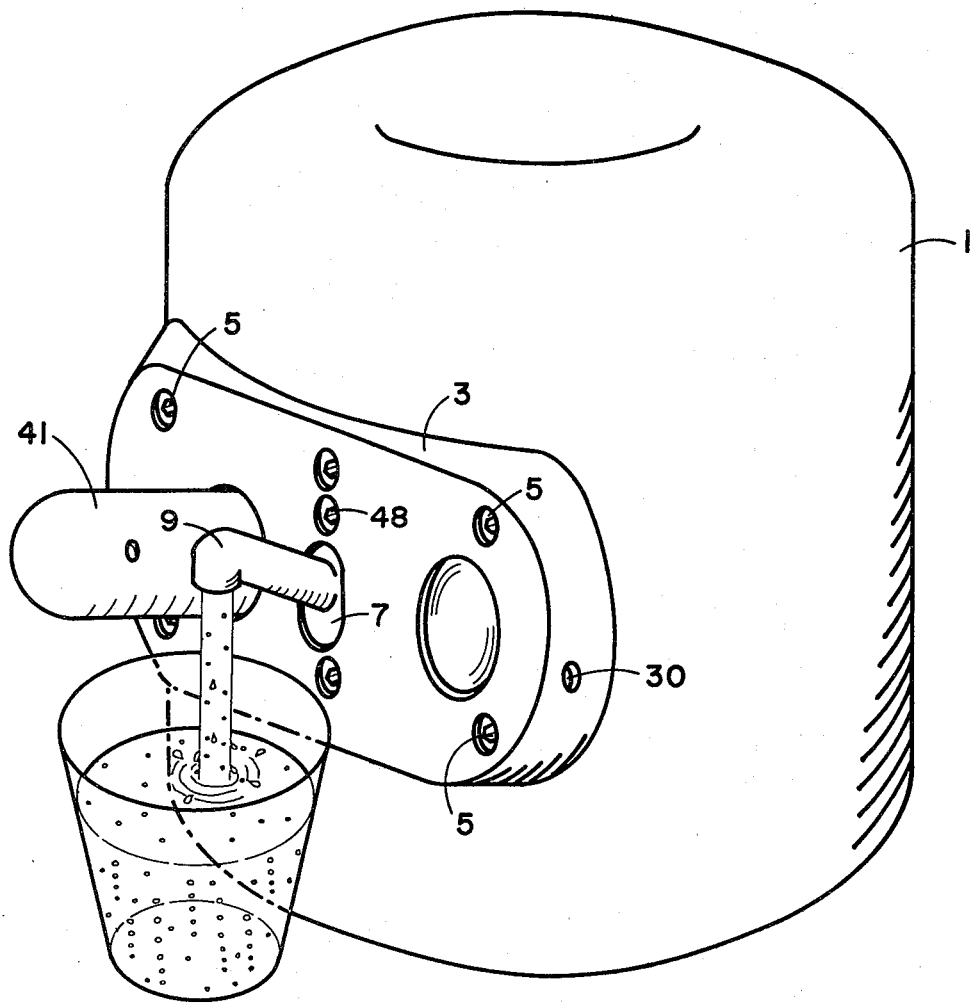
FIG. 1 is a perspective view of the carbonating container illustrating elevation of the spout to withdraw carbonated liquid from the carbonating chamber.

Referring more specifically to the drawings, the carbonating container is broadly indicated by the numeral 1. The container 1 is defined by a pressure containing rigid wall 2 of generally cylindrical configuration. Access to the interior of the container 1 may be gained by removing a closure plate which also serves as a control block 3 from the front of the container. The control block 3 includes an inner portion 4 and the portions 3 and 4 clamp about the edges of an opening in the front wall of container 1. Set screws 5 connect the outer and inner portions 3 and 4 of the closure plate and compress a rubber seal 6 to form a leak proof, pressure tight seal.

A tap ball valve 7 having a liquid passageway 8 and a tap spout 9 is journaled in sockets 12 of the plates 3 and 4. Set screws 5 fasten the valve 7 and inner portion 4 of the control block 3 tightly together. A tubular passageway 14 is formed within inner portion 4 of control block 3 between the socket 12 and the inner wall of portion 4 of control block 3. The inner end of tubular passageway 14 communicates with a tap pick-up 17 within carbonating chamber 15 of container 1, and the outer end of passageway 14 communicates with passageway 8 in valve 7. O-rings 10 and 11 extend about valve 7 at its juncture with passageway 14 and at the innerface of outer and inner portions 3 and 4 of the control block.

The carbonating chamber 15 occupies substantially all of the space within container 1 except that space occupied by an air bag 16. The space occuped by air bag 16 is variable depending upon the amount of air within it. Air from the atmosphere is introduced into bag 16 by manually actuating a pump bulb 18 to force air from pump 19 into the bag 16 through passageway 23 around check valve 28. Air is drawn into the pump 19 from the atmosphere through passageway 20 in the inner portion 4 of control block 3. The bag 16 has a bead 26 and is attached to the inner portion 4 of control block 3 by a plate 24 and screws 25. An O-ring 27 preferably extends about the passageway 23 to prevent leakage of air during its passage from pump 19 through check valve 28 into the interior of bag 16.

Figure 2:
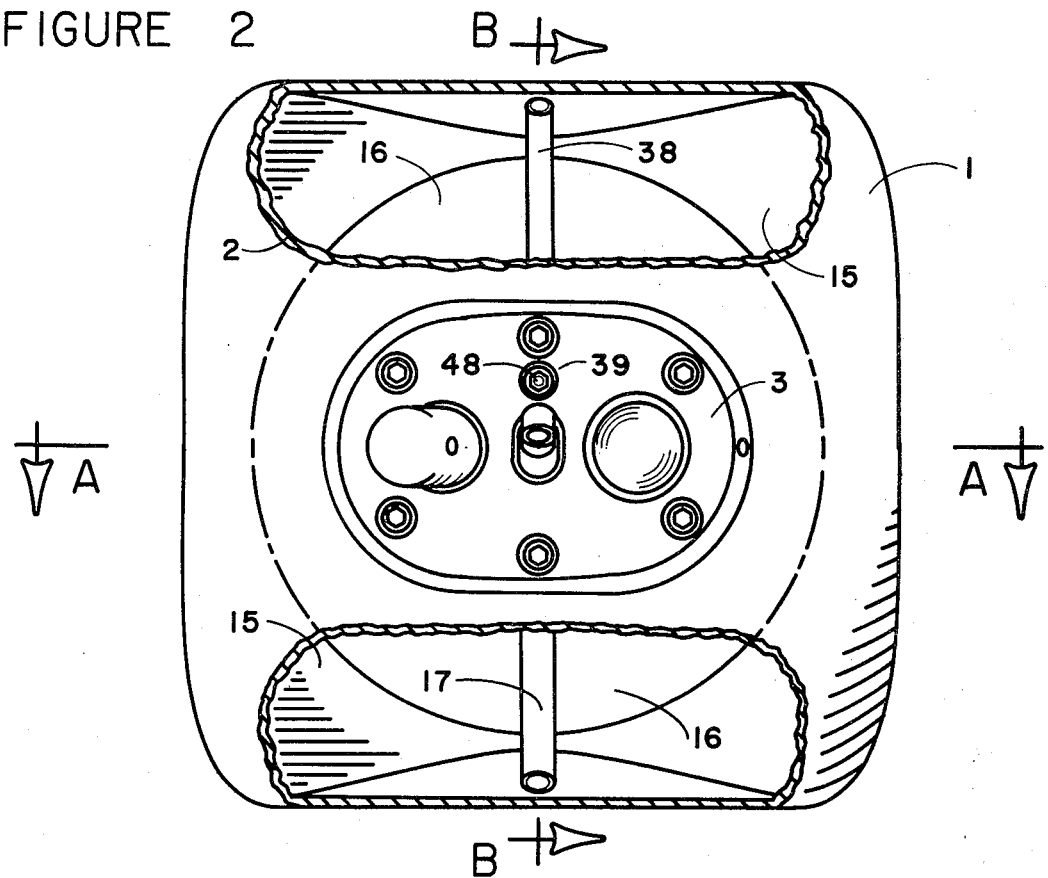
FIG. 2 is a front elevation of the carbonating container with parts broken away to show the air bag and carbonating chamber within the container.
Figure 3:
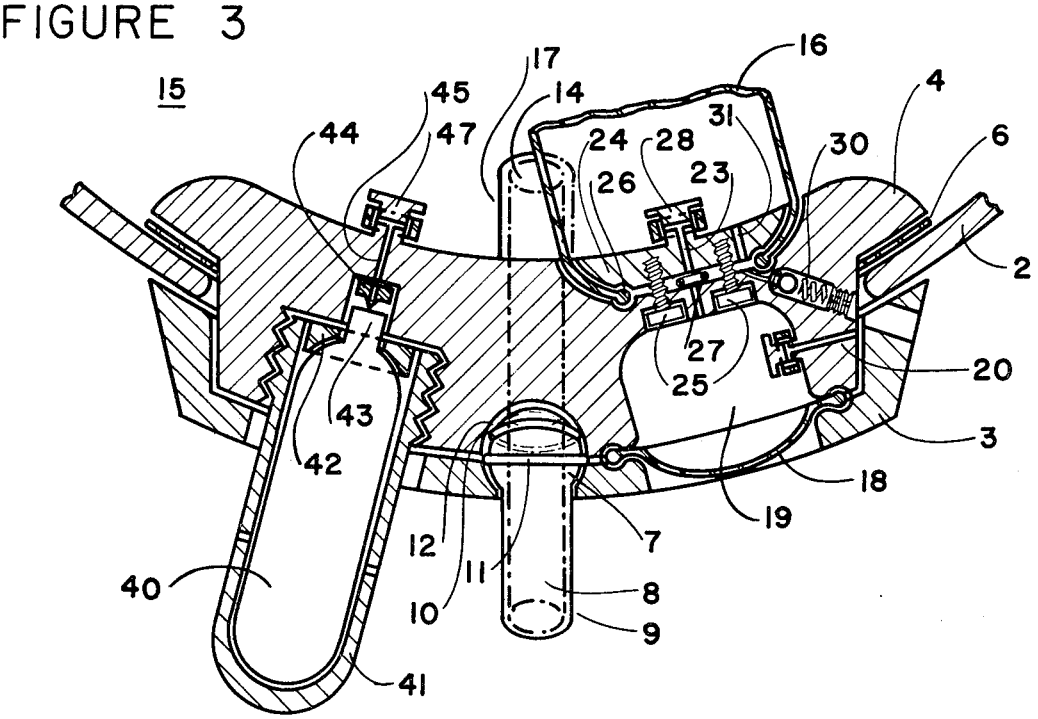
FIG. 3 is a horizontal sectional view through the control block of the container taken substantially along the line A—A in FIG. 2.

The interior of bag 16 is vented to the atmosphere through a passageway 31 extending through inner plate 4 between the interior of bag 16 and a relief valve 30 within inner plate 4 and vented to the atmosphere. The relief valve 30 is spring loaded and is threadably adjustable to relieve pressure at a predetermined setting thereby enabling the establishment of a predetermined carbonating pressure in the carbonation chamber. This is desirable because beverages differ in "volume" or level of carbonation. The quickest and highest carbonation is not necessarily the best nor the desired level of carbonation for all beverages. For example, beer is carbonated substantially lower than soda water. Carbonation is facilitated by chilling the liquid, and the temperature at which the liquid is carbonated has an effect on the optimum carbonating pressure. Assuming a constant carbonating temperature of 40 degrees, relief valve 30 may be manually adjusted to vent the air bag 16 at a high or low carbonating pressure to achieve the desired carbonation of the beverage with a minimum predetermined amount of carbon dioxide. A spring loaded pressure relief valve 48 is threadably adjustable as indicated at 39 in FIG. 2 to establish the pressure at which air or carbon dioxide gas may be allowed to escape from carbonating chamber 15 to the atmosphere. The carbon dioxide relief valve 48 is preset at a higher pressure than the air relief valve 30 so that valve 48 functionally prohibits the release of carbon dioxide gas during normal operation, conserving carbon dioxide. Valve 48 functions both as a safety valve and to purge the carbonating chamber externally of the bag 16. A passageway 49 extends from relief valve 48 through inner plate 4 and is joined with a carbon dioxide relief pick-up tube 38 terminating adjacent the top of container 1.

The liquid to be carbonated may be introduced into the carbonating chamber 15 by removing control block 3 and pouring the liquid into the chamber 15 through the hole in the wall of container 1 created by removal of block 3, but preferably the liquid is inserted in the carbonating chamber 15 without removing block 3 by (1) adjusting the relief valve 48 to vent the chamber to the atmosphere at pressures lower than that set for relief valve 30, (2) pumping air into the resilient air bag 16 which expands until it reaches limits defined by the container walls 2 and expels air from the carbonating chamber 15 through relief valve 48, (3) opening the valve 7 to establish communication between carbonating chamber 15 and spout 9, (4) attaching one end of a detachable tube T to the spout 9 and submerging the other end of tube T in the liquid to be carbonated, and (5) venting the air contained within the air bag 16 to the atmosphere through relief valve 30. It is important that relief valve 48 be reset to vent pressure in excess of the desired amount of pressure to be used during and after carbonation.

When the expanded air bag 16 is vented, it contracts with a force directly proportional to its elastic qualities and degree of expansion. The reduction of the volume of air within the bag relative to total volume of the container causes a depressurization in carbonating chamber 15 and the drawing of liquid through tube T into chamber 15 until the pressures within chamber 15 and bag 16 reach equilibrium.

By controlling the optimum input of liquid into the carbonating chamber for desired carbonation, one is able to fix at equilibrium both the volume of air contained within the bag and the volume of contents of the carbonating chamber 15. The preferred siphoning of liquid into the carbonating chamber is also advantageously hygenic and promotes safety by controlling the potential pressurization of chamber 15.

Any air remaining within the carbonation chamber 15 after it is filled with liquid to the point of equilibrium should be purged from the container through steps which comprise closing the valve 7 to tap 9, removing the tube T and operating the pump 19 to expand the bag 16 and force any air contained in the upper portion of carbonating chamber 15 through the relief valve 48 which had been and is set to vent at pressures lower than relief valve 30.

After the chamber 15 has been purged of air and liquid has been put in the carbonating chamber 15 relief valve 48 must be reset to vent at pressures higher than relief valve 30. Carbon dioxide gas may then be added to the carbonation chamber for diffusion into the liquid by inserting a carbon dioxide cartridge 40 into a threaded injector cap 41 and fitting a rubber neck ring 42 over the cartridge neck 43. The injector cap 41 with the cartridge 40 inside of it is threaded onto the inner portion 4 of control block 3 until the inner end of cartridge 40 is punctured by point 44 communicating with passageway 45 in portion 4. The rubber neck ring 42 seals the neck 43 of cartridge 40 to prevent escape of carbon dioxide gas except through passageway 45 into carbonating chamber 15. Passageway 45 communicates with check valve 47 in carbonating chamber 15 which blocks carbon dioxide gas and liquid from passing outwardly through passageway 45.

Carbonation of liquid is affected by temperature and pressure. The lower the temperature and the higher the pressure the quicker and more complete is the carbonation. A lot of carbonation as for soda water, or a relatively little carbonation, as for beer, can be achieved and maintained with this invention through use of the air bag 16 to exert a constant predetermined pressure at a given temperature on the liquid while it is being carbonated after equilibrium is established.

In use, a controlled quantity of liquid introduced is siphoned into the container, which coincidentally promotes hygiene, safe working volumes, and enables the liquid to be drawn through an in-line millipore filter (not shown) to remove any incoming yeast or bacteria, if desired. Carbon dioxide is subsequently introduced into the carbonating chamber 15 from cartridge 40 through passageway 45, and then the air bag 16 is expanded within chamber 15 by actuation of pump 19 until the pressure within bag 16 reaches the predetermined value for which the relief valve 30 has been set. This set pressure is that which has been found effective to produce a desired degree of carbonation for a particular beverage at the temperature at which it is being carbonated.

As carbonation begins, the pressure within the carbonating chamber 15 will decrease as the carbon dioxide diffuses into the liquid until the pressure within chamber 15 corresponds with pressure transmitted by the air bag 16. The pressure within chamber 15 continues to decrease as carbonation proceeds until an equilibrium between gas dissolved in the liquid and the gas above is established. Until this equilibrium is established at the desired carbonating pressure it may be necessary to operate the pump 19 to add pressure to the air bag 16 and consequently to the carbonating chamber 15 as the bag 16 expands within the chamber 15.

Figure 4:
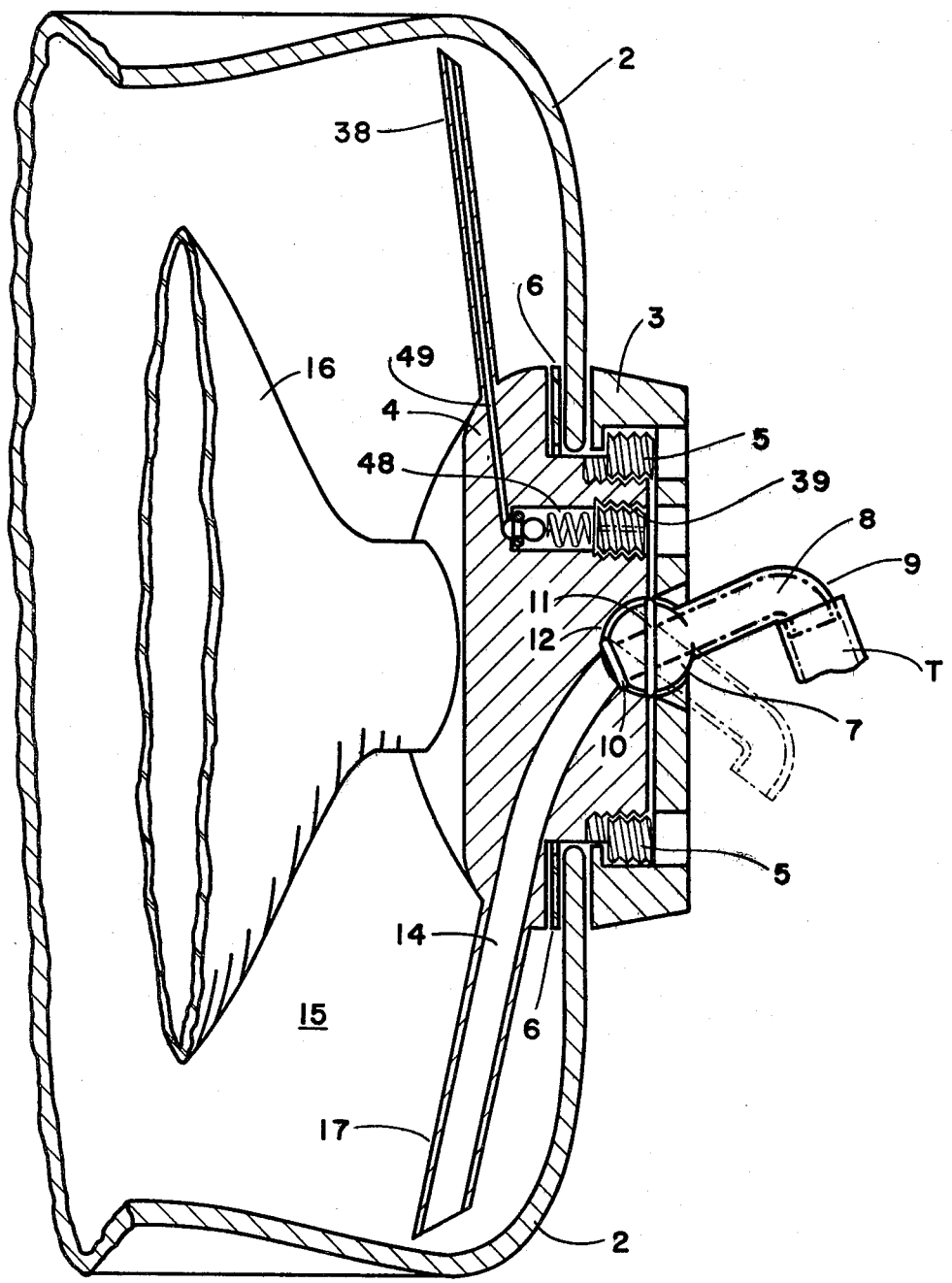
FIG. 4 is a vertical sectional view with parts broken away taken substantially along the line B—B in FIG. 2.

Carbonated liquid may be drawn from chamber 15 by elevating spout 9 to the solid line position of FIG. 4 to open valve 7 by aligning the liquid passageway 8 with the passageway 14 and tube 17 to draw liquid from chamber 15. The withdrawal of some carbonate changes the volume of liquid relative to the volume of carbon dioxide and, assuming a constant temperature, there is a loss or reduction of carbonation pressure.

According to the present invention the carbonation of the liquid remaining in the container is maintained under a constant pressure by manipulation of the pump 19 to force atmospheric air into the air bag 16 causing it to expand and occupy a greater volume within the container and exert the same pressure on the gas above the liquid as had been exerted before some of the liquid was drawn off through tap 9. Therefore, an equilibrium at the desired level of carbonation is maintained without adding contaminating air or expensive carbon dioxide to the carbonating chamber.

The air bag 16 is made of resilient material and so dimensioned as to be capable of occupying virtually all of the space within the carbonating chamber 15 so that constant pressure can be maintained on the liquid remaining within the container until substantially all of the liquid has been drawn off.

To applicant's knowledge it has not heretofore been possible to maintain a constant pressure on the liquid remaining within a container after a portion of it had been drawn off without the expense of introducing additional carbon dioxide gas or contaminating the liquid or its headspace with atmospheric air and airborne bacteria. According to the present invention constant pressure is kept on the liquid in carbonating chamber 15 by varying the carbonating chamber volume through the use of atmospheric air pumped into the air bag 16 by the manually operable pump 19.

There is thus provided an improved carbonator which will effectively achieve and maintain a fixed level of carbonation on liquid which is periodically drawn off and which requires no more carbon dioxide than that necessary for adequate carbonation of a specified liquid volume.

Although specific terms have been employed in the drawings and specification they are used in a descriptive sense only and not for purposes of limitation.

I claim:

1. A method of carbonating liquid comprising the steps of:
   (a) providing a container
   (b) providing an air bag of resilient impervious material within the container and defining a carbonating chamber exteriorly of the air bag within the container,
(c) introducing liquid into the carbonating chamber,
(d) introducing carbon dioxide into the carbonating chamber to carbonate said liquid,
(e) introducing atmospheric air into the air bag to exert a predetermined pressure against liquid in the carbonating chamber, and
(f) introducing air into the air bag to maintain the predetermined pressure against liquid in the carbonating chamber.

2. A method according to claim 1 wherein the step of introducing liquid into the carbonating chamber comprises the steps of:
(a) providing a supply of liquid exteriorly of the container,
(b) providing a siphon tube,
(c) introducing atmospheric air into the air bag to expand the bag within the carbonating chamber,
(d) establishing communication through the siphon tube between the supply of liquid and the carbonating chamber,
(e) venting a volume of air from the air bag to the atmosphere to siphon a corresponding volume of liquid from said supply of liquid through the siphon tube into the carbonating chamber.

* * * * *